United States Patent [19]
Nedderman, Jr.

[11] Patent Number: 5,839,700
[45] Date of Patent: Nov. 24, 1998

[54] ARTICULATED FIN

[75] Inventor: William H. Nedderman, Jr., Middletown, R.I.

[73] Assignee: The United States of America as represented by the Secretary of the Navy, Washington, D.C.

[21] Appl. No.: 668,605

[22] Filed: Jun. 3, 1996

[51] Int. Cl.⁶ .................................................. B64C 3/48
[52] U.S. Cl. ........................ 244/219; 244/123; 114/140; 114/127
[58] Field of Search .................................... 244/198, 201, 244/219, 123, 124, 200; 114/140, 127, 128, 126

[56] References Cited

U.S. PATENT DOCUMENTS

| | | | |
|---|---|---|---|
| 1,856,578 | 5/1932 | Miquel et al. | 244/219 |
| 3,042,371 | 7/1962 | Fanti | 244/219 X |
| 3,332,383 | 7/1967 | Wright | 244/219 X |
| 4,096,817 | 6/1978 | Bordat | 244/219 X |
| 4,131,253 | 12/1978 | Zapel | 244/219 |
| 5,004,189 | 4/1991 | Igram | 244/219 |
| 5,114,104 | 5/1992 | Cincotta et al. | 244/219 |
| 5,367,970 | 11/1994 | Beauchamp et al. | 244/219 X |
| 5,487,351 | 1/1996 | Neederman, Jr. | 244/219 X |
| 5,662,294 | 9/1997 | Maclean et al. | 244/219 |

*Primary Examiner*—William Grant
*Attorney, Agent, or Firm*—Michael J. McGowan; James M. Kasischke; Prithvi C. Lall

[57] ABSTRACT

An articulated fin of the present invention includes a nose section, a tail section, an upper flexible control surface, and a lower flexible control surface. The upper and lower flexible control surfaces each span from the tail section to the nose section. The fin further includes a gear assembly for applying compressive and tensile forces on the upper and lower flexible control surfaces. The gear assembly bends the tail section upwardly upon applying a tensile force on the upper flexible control surface and a compression force on the lower flexible control surface, and bends the tail section downwardly upon applying a compression force on the upper flexible control surface and a tensile force on the lower flexible control surface.

11 Claims, 2 Drawing Sheets

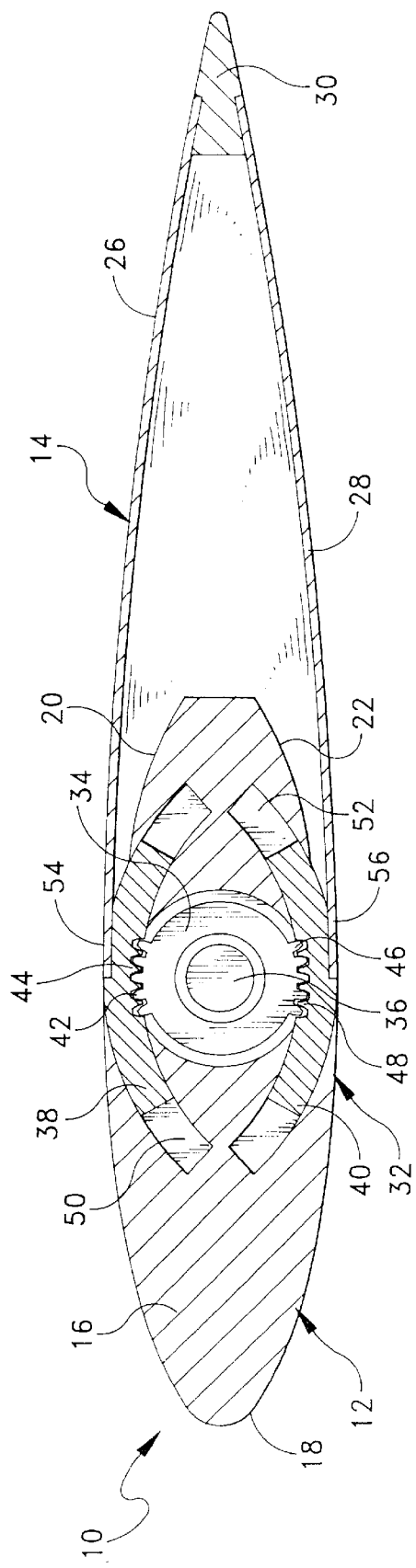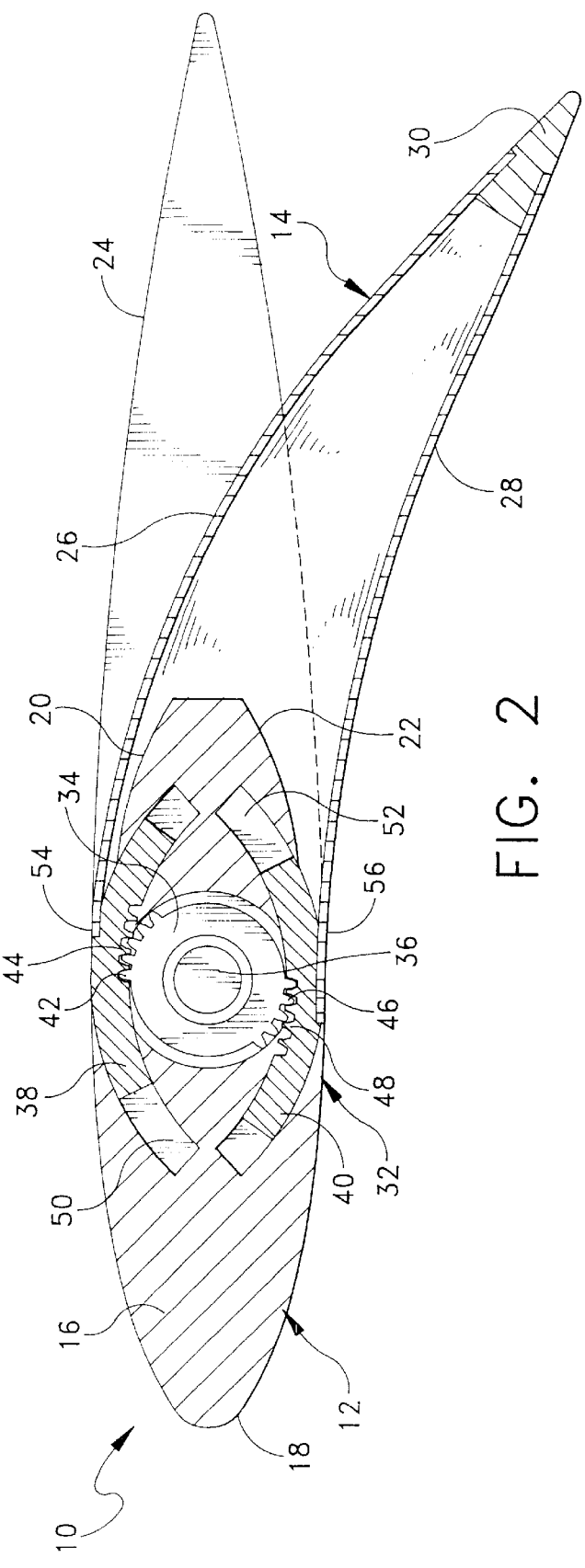
FIG. 1
FIG. 2

5,839,700

ARTICULATED FIN

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention relates generally to hydrodynamic and/or aerodynamic fins, and more particularly to an articulated fin which is capable of bending upwardly or downwardly by controlling the tension of its upper and lower surfaces.

(2) Description of the Prior Art

There are many different prior art fin designs which are constructed and arranged to change the shape and curvature of the fin for increasing or decreasing its hydrodynamic or aerodynamic resistance. Such fins can be used for many different applications, such as on submersible vessels, torpedoes, and aircraft. One well-known fin design changes its angle of attack by balancing a one-piece airfoil on its actuator shaft. Another well-known fin design has a fixed forward element with a movable rear element that is hinged to the fixed element. The angle of the rear element can be moved to a desired position for increasing or decreasing the resistance of the fin.

Presently, in the field of articulated fins, there are two common modern designs which enable the fin to change its overall shape. The first design incorporates bi-metal strips incorporated within flexible plastic material. This particular fin is actuated by applying electric current to the bi-metal strips which results in the bending of the fin. Thus, by strategically placing the bi-metal strips within the body of the fin, and carefully controlling the temperature of the bi-metal strips, the curvature and shape of the fin can be changed to a desired configuration.

The second well-known articulated fin design is a cable actuated system having leading and trailing edges which are fabricated from flexible material, the leading and trailing edges being connected to one another by a compression member. Cables are routed through the flexible material and anchored to the trailing edge in a position so that there is a pair of cables on either side of the compression member. By pulling the cables on one side, the fin bends at the compression member thereby changing the shape of the fin.

There is presently a need for a new articulated fin design which is simpler in design and more reliable in operation than these two designs.

SUMMARY OF THE INVENTION

The instant invention provides an improved articulated fin design which is a significant improvement over prior art fins.

Among the several objects of the present invention are the provision of an improved articulated fin having smooth outer surfaces for achieving optimum hydrodynamic or aerodynamic operation; the provision of such an articulated fin having reduced loading on its drive mechanism; the provision of such an articulated fin which can be easily retrofitted onto existing vehicles having actuator drive shafts; the provision of such an articulated fin which produces reliable results; and the provision of such an articulated fin which is of simple design, and easy to manufacture and operate.

In general, the invention is directed to an improved articulated fin comprising a nose section, a tail section, an upper flexible control surface, and a lower flexible control surface. The upper and lower flexible control surfaces each span from the tail section to the nose section. The fin further comprises means for applying compressive and tensile forces on the upper and lower flexible control surfaces. The compressive and tensile force applying means bends the tail section upwardly upon applying a tensile force on the upper flexible control surface and a compressive force on the lower flexible control surface, and bends the tail section downwardly upon applying a compressive force on the upper flexible control surface and a tensile force on the lower flexible control surface.

More particularly, the nose section has a forwardly positioned nose block, and the compressive and tensile force applying means comprises gear means movable with respect to and mounted on the nose block for applying the compressive and tensile forces on the upper and lower flexible control surfaces. The gear means comprises an actuating gear mounted on a shaft extending transversely with respect to the direction of the articulated fin, and a pair of oppositely positioned upper and lower gear segments which are in meshing relationship with the actuating gear. The actuating gear, when driven in a clockwise direction, moves the upper and lower gear segments clockwise for bending the tail section downwardly. When driven in a counterclockwise direction, the actuating gear moves the upper and lower gear segments counterclockwise for bending the tail section upwardly. The upper flexible control surface is attached to the upper gear segment at its forward end, and, similarly the lower flexible control surface is attached to the lower gear segment at its forward end. The upper and lower gear segments are slidably movable in respective upper and lower tracks formed in the nose block. The upper and lower gear segments and their respective tracks are each arcuate in shape, with the upper gear segment and track being located above the actuating gear and the lower gear segment and track being located below the actuating gear. The upper and lower gear segments each have teeth formed on their inwardly facing surface, the teeth being in meshed relationship with teeth formed on the actuating gear.

BRIEF DESCRIPTION OF THE DRAWINGS

A more complete understanding of the invention and many of the attendant advantages thereto will be readily appreciated as the same become better understood by reference to the following detailed description when considered in conjunction with the accompanying drawings wherein:

FIG. 1 is a cross-sectional view of an articulated fin of the present invention;

FIG. 2 is a cross-sectional view of the articulated fin in a curved position.

Corresponding references designate corresponding parts throughout the several views of the drawings.

DESCRIPTION OF THE PREFERRED EMBODIMENTS

Figure 3:
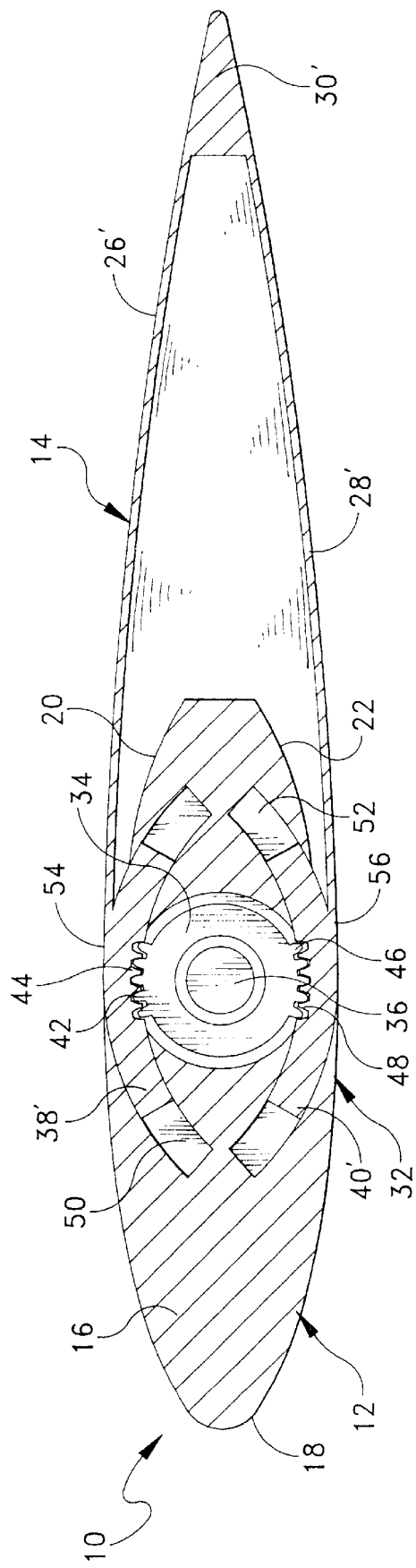
FIG. 3 is a cross-sectional view of an alternate embodiment of the articulated fin.

Referring to FIGS. 1 and 2, there is generally indicated at 10 an articulated fin of the present invention, the fin 10 being designed for use on submersible vessels, torpedoes, aircraft, and the like. Fins are well-known in the art for their ability to change the hydrodynamic or aerodynamic properties by modifying their angle of attack or shape. The fin 10 illustrated in FIGS. 1 and 2 is especially suited for use on an unmanned underwater vehicle such as a torpedo having a drive shaft which extends in a direction generally transverse to the direction of the fin. This aspect of the present invention will become apparent as the description of the fin 10 proceeds.

As shown, the fin 10 has a forward nose section, generally indicated at 12, and a rearward tail section, generally indicated at 14. The tail section 14 is capable of bending or curving upwardly and downwardly for increasing the hydrodynamic or aerodynamic resistance forces. The nose section 12 is designed so that it maintains its orientation with respect to the vehicle. The nose section 12 includes a nose block 16 which has a forwardly curved surface 18 with a flow resistance minimizing profile, and oppositely positioned top and bottom guide surfaces 20, 22 formed on the nose section's rearward end adjacent the tail section 14. The nose block 16 is suitably attached to a fin base 24 of the vehicle for mounting the fin 10 thereto (see FIG. 2).

The tail section 14 is fabricated from a pair of oppositely positioned, upper and lower flexible control walls or surfaces 26, 28 which each span from the rearward end of the tail section 14 to the rearward end of the nose section 12. Preferably, the control surfaces 26, 28 are constructed of flexible, yet somewhat rigid fiberglass and/or plastic since the tail section 14 must be sufficiently flexible so that it can assume the curved configuration illustrated in FIG. 2. The rearward ends of the control surfaces 26, 28 are secured to one another by a trailing edge member 30. Any suitable fastener can be provided for joining the rearward adjacent ends of the control surfaces 26, 28 to the trailing edge member 30.

Generally indicated at 32 is a gear assembly which provides the necessary means for applying compressive and tensile forces on the upper and lower control surfaces 26, 28 to change the shape of the fin 10. More specifically, the gear assembly 32 of the present invention bends the tail section 14 upwardly upon applying a tensile force on the upper control surface 26 and a compressive force on the lower control surface 28, and bends the tail section 14 downwardly upon applying a compressive force on the upper control surface 26 and a tensile force on the lower control surface 28. FIG. 2 illustrates the gear assembly 32 applying a compressive force on the upper control surface 26 and a tensile force on the lower control surface 28 thereby resulting in the tail section 14 bending or curving downwardly with respect to the nose section 12.

The gear assembly 32 comprises an actuating gear 34 which is mounted on a shaft 36 of the fin base 24 that extends transversely with respect to the direction of the fin 10, and a pair of oppositely positioned, upper and lower arcuately-shaped gear segments 38, 40 which mesh with the actuating gear 34. As shown, the actuating gear 34 has a first set of upwardly facing teeth 42 which mesh with a mating set of teeth 44 formed in the inwardly facing surface of the upper gear segment 38, and a second set of downwardly facing teeth 46 which mesh with a mating set of teeth 48 formed in the inwardly facing surface of the lower gear segment 40. The arrangement is such that when driving the actuating gear 34 in a clockwise direction, the upper and lower gear segments 38, 40 are likewise driven clockwise for moving the tail section 14 downwardly. Conversely, when driving the actuating gear 34 in a counterclockwise direction, the upper and lower gear segments 38, 40 are also driven counterclockwise for moving the tail section 14 upwardly.

More particularly, the upper and lower gear segments 38, 40 are each received in respective upper and lower tracks 50, 52 which are formed in the nose block 16 of the nose section 14 as elongate recesses in opposing relation with each other. As shown, the tracks 50, 52 are similarly shaped and longer in length with respect to their respective gear segment 38, 40. The tracks 50, 52 are positioned in the nose block 16 so that when they receive their respective gear segments 38, 40, the gear segments are adjacent the control surfaces 26, 28. In this regard, the upper and lower control surfaces 26, 28 are attached to their respective upper and lower gear segments 38, 40 at 54, 56, respectively, in any suitable manner (e.g., by a fastener, rivet, etc.). It should be observed that the attachment of the upper and lower control surfaces 26, 28 to their respective gear segments 38, 40 provides a continuous surface between the nose section and the tail section which is important for improving the dynamic characteristics of the fin. Notches (not designated) are formed in the gear segments 38, 40 for facilitating the continuous outer surfaces of the fin 10, the terminal edges of the control surfaces 26, 28 abutting the notches of the gear segments.

Referring to FIG. 1, the fin 10 is illustrated in its optimal hydrodynamic or aerodynamic position in which the tail section 14 extends along a line generally parallel with respect to the nose section 12. The fin 10 is supported in this position by the fin base 24 (see FIG. 2) in any suitable manner. As shown, the upper and lower control surfaces 26, 28 are in a neutral position wherein neither of them are subjected to compressive or tensile forces.

To move the tail section 14 of the fin 10 downwardly as illustrated in FIG. 2, the actuating gear 34 is rotated in clockwise direction. The actuating gear 34 moves the upper gear segment 38 within the upper track 50 from a generally central position (FIG. 1) to a right-hand position (FIG. 2). This results in a compressive force being applied to the upper control surface 26 and a tensile force being applied to the lower control surface 28. Reference can be made to the offset relationship between the leading edges of the control surfaces 26, 28, the lower control surface leading edge being positioned forward of the upper control surface leading edge. The compressive and tensile forces on the upper and lower control surfaces 26, 28, respectively, bend or curve the tail section 14 downwardly. The movement of the tail section 14 is controlled by the top guide surface 20 of the nose block 16 which engages the underside of the upper control surface 26 for ceasing or limiting its movement.

It should be understood that the movement of the tail section 14 upwardly with respect to the nose section 12 can easily be accomplished in the reverse manner, i.e., by rotating the actuating gear 34 in a counterclockwise direction. The bottom guide surface 22, in this situation, limits the movement of the tail section 14 since it engages the underside of the lower control surface 28.

It should be observed that the articulated fin 10 of the present invention is especially effective in moving the tail section 14 in any desired position since the gear assembly 32 provides positive movement which is lacking in the temperature sensitive articulated fins of the prior art. Moreover, the integrity of the fin's outer surfaces is maintained by the attachment of the upper and lower control surfaces 26, 28 to respective upper and lower gear segments 38, 40 and by the operation of the gear assembly 32.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims. Although the terms "upper" and "lower" have been used throughout this specification, this fin can obviously be used in either a horizontal or vertical configuration.

More particularly, a production version of this invention can be made using a one piece gear segment, control surface and trailing edge member assembly as shown in FIG. 3. It is envisioned that rearward tail section 14 could be made as a one piece casting from durometer polyurethane or another elastomeric material. This construction may provide superior fluid flow characteristics. FIG. 3 shows the invention as installed with rearward tail section 14 having integral gear segments 38 and 40 and control surfaces 26 and 28 joined to an integral trailing edge member 30.

What is claimed is:

1. An articulated fin comprising:

a nose section having a forwardly positioned nose block;

a tail section movably attached to the nose section and extending rearwardly therefrom, said tail section having an upper flexible control surface and a lower flexible control surface; and means for applying compressive and tensile forces on the upper and lower flexible control surfaces, said compressive and tensile force applying means bending the tail section upwardly upon applying a tensile force on the upper flexible control surface and a compressive force on the lower flexible control surface, and bending the tail section downwardly upon applying a compressive force on the upper flexible control surface and a tensile force on the lower flexible control surface, said compressive and tensile force applying means comprises a gear means movable with respect to and mounted on the nose block for applying the compressive and tensile forces on the upper and lower flexible control surfaces;

wherein said gear means comprises:

an actuating gear extending transversely with respect to the direction of the articulated fin; and a pair of oppositely positioned upper and lower gear segments slidably attached to the nose block, said upper and lower gear segments each having teeth formed on their inwardly facing surface, said teeth being in meshed relationship with teeth formed on the actuating gear, said upper flexible control surface being attached to the upper gear segment at its forward end, and said lower flexible control surface being attached to the lower gear segment at its forward end, said actuating gear, when driven in a clockwise direction, moving said upper and lower gear segments clockwise for moving said tail section downwardly, and, when driven in a counterclockwise direction, moving said upper and lower gear segments counterclockwise for moving said tail section upwardly.

2. The articulated fin of claim 1 wherein said nose block has upper and lower tracks in the form of elongate recesses formed therein, and said upper and lower gear segments being slidably movable in said upper and lower tracks, respectively.

3. The articulated fin of claim 2 wherein said upper and lower tracks are formed opposite one another in said nose block.

4. The articulated fin of claim 3 wherein:

said upper and lower gear segments are each arcuate in shape;

said upper track being arcuate in shape and positioned above said actuating gear; and said lower track being arcuate in shape and positioned below said actuating gear.

5. The articulated fin of claim 1 wherein said nose block has a pair of oppositely positioned guide surfaces formed adjacent the tail section, said guide surfaces interfering with said upper and lower flexible control surfaces and limiting curvature of said control surfaces when said control surfaces are moved past a preset position.

6. The articulated fin of claim 1 wherein said upper and lower flexible control surfaces are joined integrally with said gear segments, and said upper and lower flexible control surfaces are joined together to form a trailing edge member.

7. An articulated fin comprising:

a nose section;

a tail section movably attached to said nose section and extending rearwardly therefrom, said tail section having first and second flexible control surfaces;

an actuating means joined to move said first flexible control surface and said second flexible control surface relative to said nose section;

wherein said actuating means comprises:

an actuator shaft;

a gear having gear teeth and positioned on said actuator shaft;

a first rack joined to said tail section first flexible control surface and meshing with said gear;

a second rack joined to said tail section second flexible control surface and meshing with said gear; and said nose section having an actuator shaft aperture formed therein to allow said actuator shaft to pass therethrough, said nose section further having first and second tracks formed therein with said first rack being slidably positioned in said first track and said second rack being slidably positioned in said second track, said racks moving in said tracks on rotation of said actuator shaft.

8. The articulated fin of claim 7 wherein said first and second racks are arcuate in shape and said first and second tracks are also arcuate in shape.

9. The articulated fin of claim 7 wherein said tail section further comprises a trailing edge element joined at the rear of said tail section between said first flexible surface and said second flexible surface.

10. The articulated fin of claim 9 wherein said tail section including said first and second flexible surfaces, and said trailing edge is formed in one piece.

11. The articulated fin of claim 10 wherein said tail section is formed in one piece with said first rack and said second rack.

* * * * *